(12) United States Patent
Dulaney et al.

(10) Patent No.: US 10,853,336 B2
(45) Date of Patent: Dec. 1, 2020

(54) TRACKING DATABASE CHANGES

(75) Inventors: Marissa Dulaney, Morgan Hill, CA (US); Robert Shaver, Watertown, MA (US)

(73) Assignee: Adobe Inc., San Jose, CA (US)

( * ) Notice: Subject to any disclaimer, the term of this patent is extended or adjusted under 35 U.S.C. 154(b) by 1179 days.

(21) Appl. No.: 12/240,466

(22) Filed: Sep. 29, 2008

(65) Prior Publication Data

US 2014/0032501 A1    Jan. 30, 2014

(51) Int. Cl.
*G06F 17/30*      (2006.01)
*G06F 16/21*      (2019.01)

(52) U.S. Cl.
CPC .................. *G06F 16/219* (2019.01)

(58) Field of Classification Search
USPC .......................................... 707/695
See application file for complete search history.

(56) References Cited

U.S. PATENT DOCUMENTS

| | | | |
|---|---|---|---|
| 5,546,580 A * | 8/1996 | Seliger et al. | |
| 6,342,906 B1 | 1/2002 | Kumar et al. | |
| 6,721,921 B1 | 4/2004 | Altman | |
| 2002/0065795 A1* | 5/2002 | Asherman | H04L 67/2842 |
| 2002/0082994 A1* | 6/2002 | Herziger | G06Q 10/06 705/43 |
| 2002/0120638 A1* | 8/2002 | Boehmke | 707/203 |
| 2002/0120765 A1* | 8/2002 | Boehmke | 709/231 |
| 2003/0011646 A1* | 1/2003 | Levine | G06F 19/3418 715/848 |
| 2003/0208401 A1* | 11/2003 | Karsten | 705/14 |
| 2004/0103369 A1* | 5/2004 | Robertson | G06F 17/245 715/234 |
| 2004/0172372 A1* | 9/2004 | Wells | G06Q 20/20 705/400 |
| 2005/0060200 A1* | 3/2005 | Kobylevsky | G06F 19/3456 705/2 |
| 2006/0010098 A1* | 1/2006 | Goodnow | G06F 19/322 |
| 2006/0168025 A1* | 7/2006 | Jain | H04L 51/066 709/206 |
| 2007/0271161 A1* | 11/2007 | Kaiser | G06F 3/0481 705/32 |
| 2008/0172597 A1* | 7/2008 | DeHaan | G06F 17/246 715/222 |
| 2009/0300076 A1* | 12/2009 | Friedman et al. | 707/200 |
| 2010/0077332 A1* | 3/2010 | Haynes | G06F 16/93 715/765 |

* cited by examiner

*Primary Examiner* — Irete F Ehichioya
*Assistant Examiner* — Johnese Johnson
(74) *Attorney, Agent, or Firm* — Shook, Hardy & Bacon LLP

(57) ABSTRACT

Apparatus, systems, and methods may operate to detect a plurality of changes to one of a database format and database content between a first version of a database and a second version of the database, and to transmit change information to a receiving entity, enabling display of the plurality of changes in at least one of a row-wise collective format, a column-wise collective format, a field-wise collective format, or a record-wise collective format. Additional apparatus, systems, and methods are disclosed.

16 Claims, 6 Drawing Sheets

TRACKING DATABASE CHANGES

BACKGROUND

In many fields of endeavour, electronic content is reviewed and revised. Thus, over the lifetime of the content, many revisions can occur. If the content is stored in a database, revisions may be stored in the database as well. However, as the number of changes increases, so does the complexity of comprehending the content change history over time.

BRIEF DESCRIPTION OF DRAWINGS

Some embodiments are illustrated by way of example, and not limitation, in the figures of the accompanying drawings, in which.

DETAILED DESCRIPTION

Figure 1:
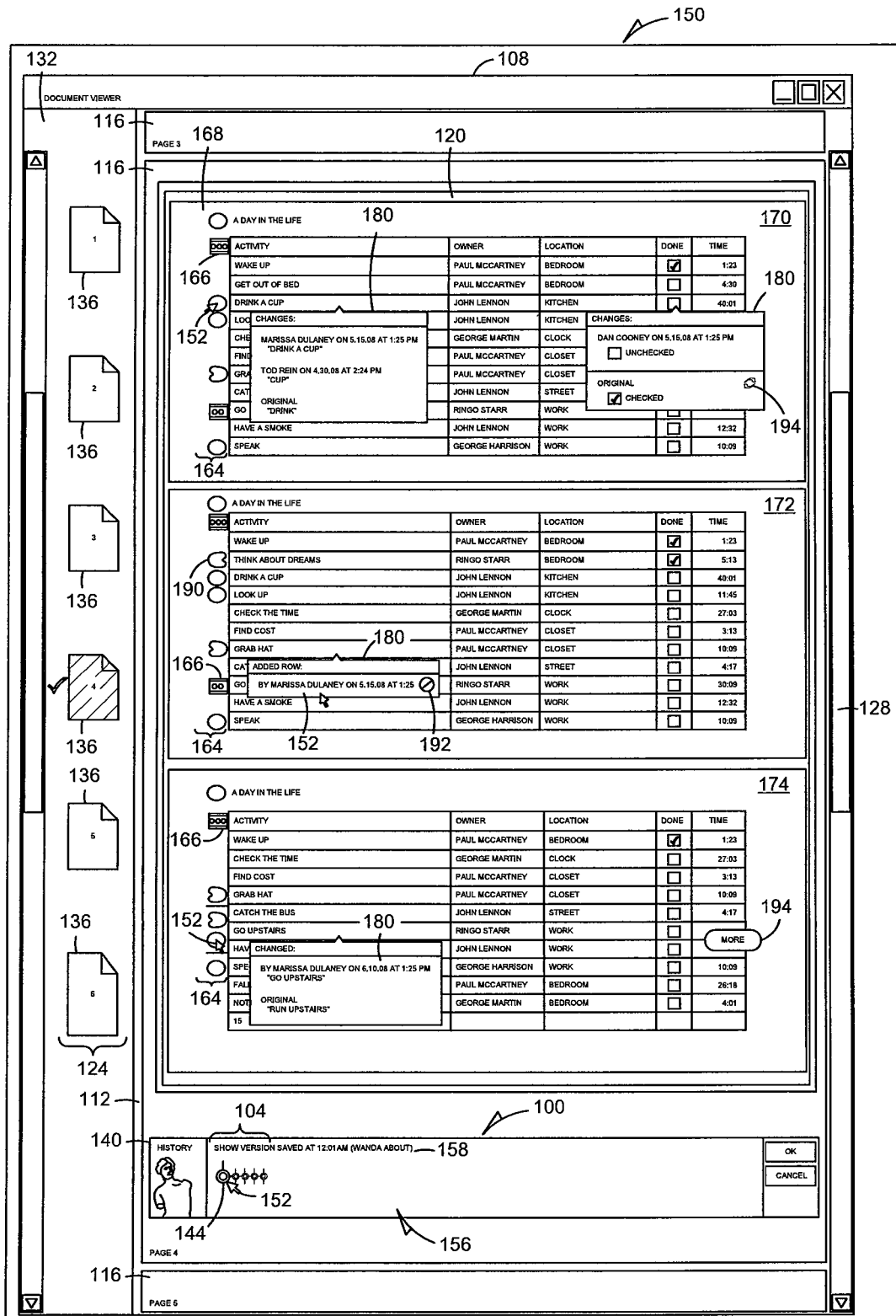
FIG. 1 illustrates the display of changes to database content using a collective format as part of a graphical user interface (GUI), according to various embodiments.

Almost all database application programs operate to save the most current version of the database while it is being created. Some of these applications permit saving prior versions as well, thereby forming an archive of saved versions. An example embodiment seeks to enhance the monitoring of multiple changes between versions by displaying a summary of the changes in a row-wise and/or column-wise collective format. This example mechanism can lead to more efficient database content review operations, especially in situations when several users are involved in contributing to the content.

The various embodiments offer a dramatic departure from what has been done previously, where individual changes may be indicated cell-by-cell (e.g., in a spreadsheet application). Indeed, in some databases, the user can only determine that content has changed, but there is no indication of the type of change that occurred. Thus, with these more conventional indications of change, the user can see that individual cells have changed, but summary changes along an entire row are not indicated. Accordingly, when the data in an individual cell has changed, the user is unaware of the change unless/until the cell is actually displayed for viewing.

As a matter of contrast, in the various embodiments described herein, multiple (e.g., all) changes for a row, column, or both can be grouped into a single indicator for the respective row or column. When a user moves a cursor over the indicator and leaves it there, at least momentarily (e.g., causing cursor hover activity to occur, which can be detected as a user selection input), multiple indicators, one for each change that has occurred in that row/column, where they occur, are shown. In addition, the changes for each element, such as a cell, can also be viewed by hovering the cursor over the individual element.

For example, if a row has been added, and then deleted, a row-wise indicator that indicates deletion can be displayed, and when that row is highlighted, for example using cursor hover activity over the indicator (or some other detectable form of user selection input), all of the changes that have occurred in the past can likewise be shown. For columnar changes, such as changes in headers, or formulas, a single change indicator can be shown—in contrast to individual cell change indicators for each cell in the affected row.

Thus, all changes in a row or column can be grouped into a single indicator that indicates each type of change that has occurred. For example, if multiple changes to a row have been implemented, such as a row that has been added, a row style change, and changes to the content of four cells in the row, all of these changes can be grouped into a single indicator for that row. When the user acts to indicate that more information is desired, such as by hovering a cursor over the collective change indicator, the indicator can operate to explode into three distinct change indicators—one for each type of change. Then, if the user moves the cursor to hover over one of the three indicators, additional information (e.g., a detailed history) about the type of change selected can be displayed.

For the purposes of this specification, the term "collective format" is defined as a display format that uses visual indicia to indicate a coded summary of multiple (e.g., all) non-identical changes in a single row (row-wise collective format) or column (column-wise collective format), or in a single field within a group of records (field-wise collective format), or among a group of records in a database (record-wise collective format). For example, a single visual element, such as an icon, can be used to provide a coded summary of multiple non-identical changes that have occurred in a single row or column.

The summarized changes may be of a single type (e.g., non-identical text changes to more than one element in a row/column), or of multiple types (e.g., the addition of text to one element in a row/column, and the deletion of text from another element in the same row/column). The indicia may be coded by color, gray-scale shade, degree of transparency/opacity, shape, shape orientation, shape size, and graphics (e.g., an icon) or some combination of these. Similar indications can be made with respect to such changes with respect to a single field within a group of records, or within a group of records that form part of a database.

"Electronic content" includes any digital data that may be presented to a user (e.g., visually or audibly presented), such as an electronic document, page-descriptive electronic content such as a page-descriptive electronic document, a media stream, a web page, a hypertext document, an image, digital video or a video recording, digital audio or an audio recording, animation, a markup language document, such as a HyperText Markup Language (HTML) or eXtensible Markup Language (XML) document, a form having blank components to accept entered data, or data describing the application of a GUI.

A "content element" includes any part of electronic content that is defined or discernable as a part. For example, a content element may be automatically discerned from a characteristic of the content element itself (e.g., a paragraph of an electronic document, a cell of a spreadsheet, or a database record or field) or may be manually defined by a user (e.g., a user-selected collection of words in an electronic document, a user-selected portion of a digital image). Examples of content elements include portions of a page-descriptive document or other electronic document, such as pieces of electronic text or other material within an electronic document, dynamic content in the form of portions of media streams, such as sections of digital video or frames or sets of frames of digital video or digital audio, dynamic content in the form of segments or frames of animations, electronic forms, form templates, form elements, form data, actuatable element specifications or executable instructions, and various elements presentable or accessible by users within electronic content, including instances of scripted and non-scripted dynamic content and the like.

"Documents" may be organized according to a page descriptive format, which includes a portable document format, where "portable document format" means a device-independent and display resolution-independent fixed-layout document format, including the text and fonts, images, and graphic paths associated with the document. The format may comprise a representation of a two-dimensional document, or a three-dimensional document. An example of a commercially available portable document format (PDF) is the format described in "PDF Reference", sixth edition, ADOBE® Portable Document Format, Version 1.7, November 2006.

The term "rendering" used as a verb includes presenting or making accessible electronic content or content elements to be perceived, viewed, or otherwise experienced by a user, or made available for further processing, such as, for example, searching, digesting, printing, analyzing, distilling, or transforming by computational processes that may not include processing the intrinsic data structure describing the electronic content or content element.

The term "rendering" used as a noun includes human-perceivable representations of data that is within a machine and perception-specialized organizations of data defining such representations. For example, a rendering may include a pattern of human-perceivable matter or energy presented on an output device (e.g., a display) by a machine, as well as the organization of data within a machine that defines such patterns. For example, such organizations of data may include the electronic configuration of a memory used by a graphics display processor, or a file containing an audio segment suitable for playing via an audio system of a computer.

The term "rendering module" may be taken to include systems, applications, and mechanisms for rendering or presenting electronic content to a user, including the presentation of content elements such as text, graphics, form element renderings, and other electronic content elements. An example of a rendering module includes a web browser component (e.g., Microsoft® Internet Explorer) or other component to render electronic content such as HyperText Mark Language (HTML) pages. Another example of a rendering module includes the ADOBE® ACROBAT® electronic publishing program.

The term "rendering program" includes applications for rendering or presenting dynamic content to a user. An example of a rendering program is the ADOBE® FLASH® Player 9 runtime software application. In many embodiments, a rendering module interacts with a rendering program to render dynamic content.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information, such as a database). Modules may include hardware circuitry, optical components, single or multi-processor circuits, memory circuits, software program modules and objects, firmware, and combinations thereof, as appropriate for particular implementations of various embodiments. The term "module" can include an identifiable portion of code, data, or a computational object to achieve a particular function, operation, processing, or procedure.

When viewing, reviewing, or revising, a user may start up an application (e.g., a rendering module) to render or otherwise present electronic content. This electronic content may take a variety of forms, such as an electronic document, an audio file, video file, sequence of images, dynamic content, combinations thereof, and other forms of electronic content, which may be stored in a database.

During the course of this activity, the user may be presented with a rendering of various content elements (e.g., using an output device, such as a display) included or otherwise associated with the electronic content. In some embodiments, these content elements may be presented in a sequential order so as to indicate their positions or interrelationships within the electronic content, or for ease of user perception. For example, database content may be displayed in the form of a spreadsheet.

Various types of content elements contained within electronic content may be presented to a user on an output device in various ways according to the nature of the content elements and/or the preferences of users. For example, electronic content representing an electronic document may be presented on a display screen in the form of renderings of pages as they might appear if the electronic document were to be printed out. Content may also be displayed as a single or multiple-page spreadsheet, and in other ways. In some such embodiments, the user may use a mouse, keyboard, touch pad, voice input or other input devices to explore the electronic content.

The application may provide such affordances as scroll bars, fast forward/reverse scan buttons, or other GUI elements to be manipulated by the user to carry out exploration of the electronic content. This exploration may be used when the entirety of the electronic content is too large to conveniently display on a computer screen at one time.

While reviewing or revising electronic content that includes content elements, the user may wish to record or otherwise keep track of a particular state of revision. One way of tracking this state is by saving a version of the electronic content, and adding it to the content archive history. It is the management of these versions of stored content that form the archive history, along with monitoring the differences between them, that is addressed by the various mechanisms described herein.

FIG. 1 illustrates the display of changes to database content using a collective format as part of a GUI 108, according to various embodiments. The manner of explanation used herein has been undertaken for convenience and clarity, so as not to obscure the operation of various embodiments with myriad details, and is therefore not to be taken by way of limitation. That is, while the various examples given herein are generally directed to the use of database storage, and visual display in a spreadsheet format, the various embodiments are not to be so limited.

A database file revision history 100 is shown along a time line 104 with tracked changes as part of a GUI 108, according to various embodiments. The GUI 108 shows an example of a GUI viewport 112 window that may be displayed by a rendering application to present renderings of electronic content in the form of an electronic document 124 that includes several pages 116 of information 120. For example, the electronic content stored in a database may be displayed on several pages of a document 124, as a large spreadsheet contained on a single page 116, or as a number of spreadsheet representations broken up into individual panes and/or pages 116 (as shown).

The viewport 112 permits a reviewer to see some or all of the document 124; typically, only a portion is shown. In FIG. 1, all of one page 116 (page 4) and parts of other pages 116 (page 3 and page 5) are visible. On the right hand side of the GUI 108, a scroll bar 128 may be provided for a user/reviewer to scroll through renderings of the various pages 116 of the electronic document 124. The left hand side of the GUI 108 may include a reviewing pane 132 populated by thumbnail or iconic images 136 representing various pages in the electronic document 124.

In most embodiments, an end-user or "user" of a content processing application constructed to operate according to the principles disclosed herein can access various versions of the document 124 (with the exception of the working version) by clicking on a history icon 140. The history icon 140, as well as the time line 104, may form a part of the GUI 108 display associated with a document or database processing program, and can be located anywhere in the GUI 108, as desired. For example, in the lower left or lower right corner of a display 150, such as a workstation display screen, as shown in FIG. 1.

Executing the command represented by the icon 140 has the effect of presenting the time line 104 that includes the most recent version 144, and all past versions (e.g., those versions that are on the time line 104, and do not include the most recent version 144), to the user. In some cases, the current version is shown as being selected at the far left of the time line 104, and as a mouse or other user-controlled pointing device is moved to hover a pointer 152 over each indicated version on the time line 104, a message 156 is displayed to show the identity of the person that created that version, and the time at which it was created (e.g., when it was saved). If the pointing device is "clicked" or otherwise actuated to indicate a selection, the particular version of the document selected (here, the current version) is presented for viewing. Separate versions of a document 124 arise upon saving the document 124 when changes to the text or other content of the document 124 is made.

As the content within a document 124 (e.g., the content of a database) is edited, various versions can be saved locally, or on a server. Each version is a snapshot of the entire document 124, including merged comments from reviewers. Saving the document 124 can be triggered in many ways, including receiving an explicit "save" command from a user, or by an application program auto-save mechanism which is not directly controlled by the user.

Each time a document's contents 120 are saved (e.g., explicitly responsive to a user command or automatically via auto-save), they can be saved as a new version, rather than overwriting the previous version. Versions may be maintained in the archive history 100 along with the date-time when they were saved (created), and the identity of the user who saved them.

Three different types of collective format change displays are shown in the single viewport 112. Normally only a single viewing pane 172, 172, 174 would be visible to a user. However, for purposes of convenience and economy, three different panes 172, 174, 176 are shown simultaneously in this example. Multiple cursors 152 are shown in the single viewport 112 for the same reason.

In the first pane 170, a variety of collective format visual indicia, such as the change indicators 164 are shown. Most of the indicators 164 provide a row-wise change summary. One indicator 166, which comprises a multi-change collective format change indicator, also provides a column-wise change summary. Another indicator 168 serves to indicate a change to the title assigned to the content of the document 124.

In pane 170, a cursor 152 hovers over a collective format change indicator 164 located next to a highlighted row (i.e., where the Activity="Drink a cup"). This indicator, which may be colored blue and have no particular directional orientation (e.g., a circular indicator) can serve to generally indicate that change has occurred to the content in that row—and that the change was neither an addition, nor a deletion. The detection or receipt of hovering activity by a cursor 152 can operate to indicate selection of a more detailed display. In this case, when the cursor 152 is moved to hover over the indicator 164, detailed change balloons 180 are displayed at all locations where change has occurred in that row—in this case, two.

In the first balloon 180, a date/time history of the changes that have occurred since the original content for the "Activity" column was entered are shown. In the second balloon 180, a date/time history of the changes that have occurred since the content for the "Done" column was entered are shown. In each case, the history balloons 180 may continue to be displayed for a determinable amount of time prior to fading away (e.g., for about five seconds after hovering activity is detected), unless one or the other balloon 180 is selected via further activity associated with the cursor 152 prior to that time, such as receiving a mouse click to select an individual item in one of the balloons 180. In other embodiments, the history balloons 180 may be displayed until the cursor moves to hover over another collective format change indicator 164.

Thus, in some embodiments, while the history balloons 180 are displayed, the user may then "click" or otherwise act to select an individual item in one of the balloons 180. This type of selection activity may be used to maintain the value of the current in its present state (e.g., by clicking on the most recent historical value of several shown in the balloon 180). This type of activity may also be used to return the value of an item to a prior state (e.g., by selecting a "reuse" graphic 194 next to a single item in a balloon 180). If the value is changed, such as re-using a value from a prior state, this activity is itself recorded as a change, and added to the content of the history balloon 180 for that item.

In pane 172, a cursor 152 hovers over a change history balloon 180 that appeared when the cursor 152 moved to hover over the collective format change indicator 164 next to the highlighted row (i.e., where the Activity="Grab hat"). The collective format change indicator 164 in this case might be colored green and point toward the row to indicate the general nature of the change was an addition. In this particular case, the detailed history shows that only one change has occurred for that row—the row itself was added.

In some embodiments, collective format change indicators 190 may be colored red and point away from their respective row to generally indicate that deletion activity has occurred. In this case, hovering the cursor 152 over such an indicator 190 might operate to display the deleted content with reduced visibility, and the deleted content might be reinstated by clicking on the resulting history balloon, or an icon within the history balloon, to indicate this content should be reinstated.

Thus, if desired, the user viewing the display shown in pane 172 may then "click" or otherwise act to select an individual item in the history balloon 180 (e.g., the crossed-out circle in the history balloon 180) to undo the change—in this case, to remove the row that was added. For example, an "undo" graphic 192 next to a single item in the balloon 180 might be selected using a mouse click to undo the change. Removing the row after it has been added will then be recorded in the content of the history balloon 180 as an additional change, which can in turn be undone at a later time, if desired.

In pane 174, a cursor 152 hovers over a multi-change collective format change indicator (e.g., similar to or identical to that shown as indicator 166 in pane 172). The multi-change collective format change indicator 166 can be used to indicate that multiple types of change (e.g., changes of more than one type, such as having a green dot for addition and a red dot for deletion) have occurred in the same row or column.

The indicator 166 in this case might have two dots, one that is green to indicate an addition, and one that is blue to indicate a change. Hovering the cursor 152 over each dot may result in the display of history balloons 180 that are germane to that color—such as showing only the "content added" change history balloons for that row if the cursor 152 hovers over a green dot in the indicator 166, or showing only the "content changed" change history balloons for that row if the cursor 152 hovers over a blue dot in the indicator 166.

The indicator 166 may operate to split into multiple collective format change indicators 164 when the cursor 152 hovers over it and the user acts to select the indicator 166 by "clicking" on it. In this case, the indicator 166 may split into two collective format change indicators 164, each summarizing a different type of change. For example, the revealed upper collective format change indicator 164 could be colored green and point toward the row to indicate that an item was added (not shown). The revealed lower collective format change indicator 164, which is shown being selected by the hovering cursor 152 in this case, could be colored blue and not oriented in any particular way (e.g., a blue, circularly-shaped indicator 164) to indicate that the item content has changed—and that the change was neither an addition nor a deletion.

As noted in previous examples, if desired, the user may then "click" or otherwise act to select an individual item in the history balloon 180 to maintain the current item in its present state, or to return its value to a prior state. If the value is returned to a prior state, this activity is recorded as an additional change, and added to the content of the history balloon 180 for that item. If there are other history balloons that can't be shown in the viewport 112 because of screen size limitations, some embodiments may display a "MORE" button 194 that can be activated by a user to initiate scrolling and display of the additional balloons (not shown).

Figure 2:
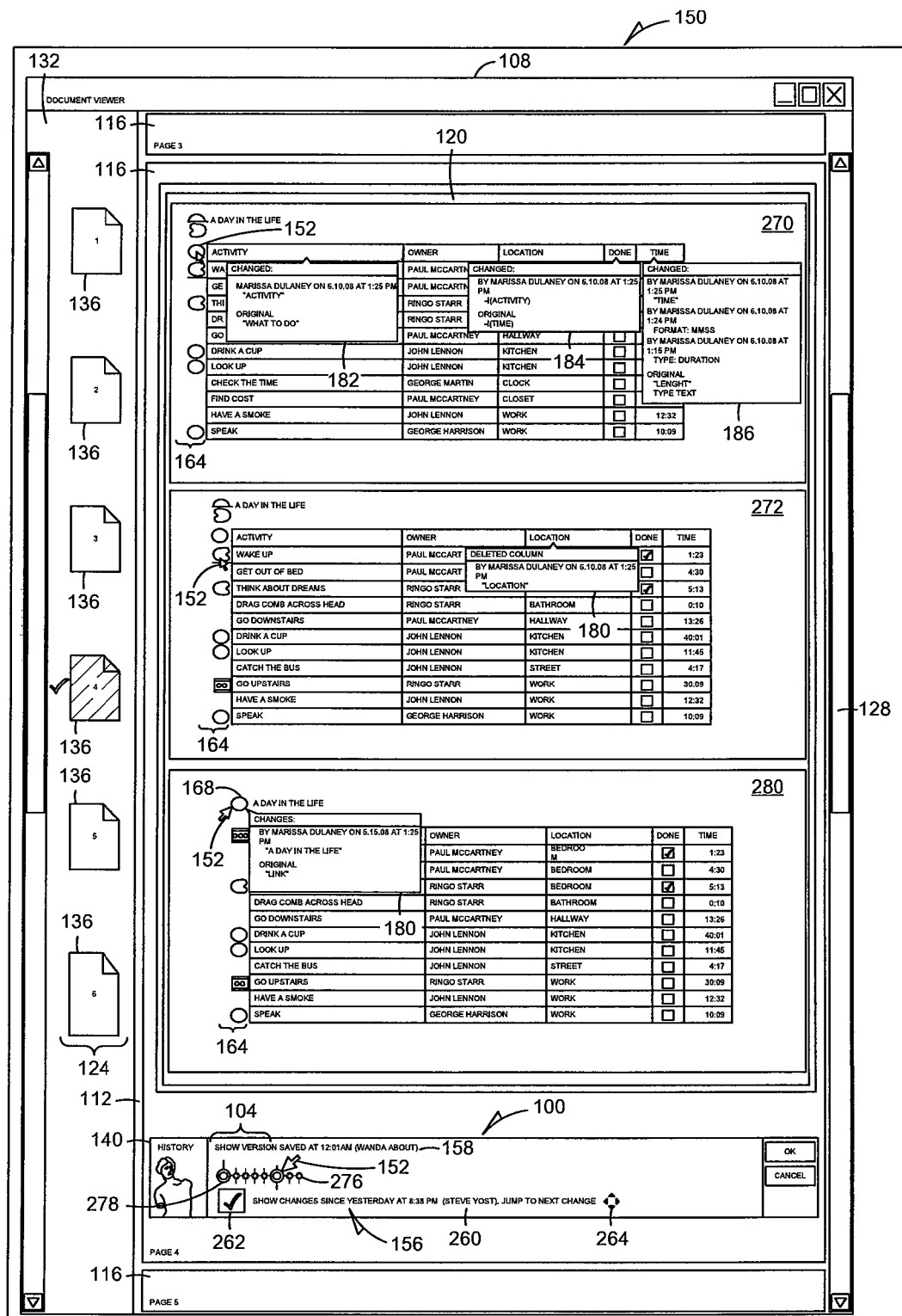
FIG. 2 illustrates additional ways to display content changes within a database, using a collective format as part of a GUI, according to various embodiments.

FIG. 2 illustrates additional ways to display content changes within a database, using a collective format as part of a GUI 108, according to various embodiments. Here again, the versions of the database available for viewing can be indicated using version indicators along the time line 104. In some embodiments, the version indicators comprise a dot version indicator 276 to indicate versions available for viewing, and a circle version indicator 278, to indicate versions that have been selected by the system and/or a user to view, and between which a history of the changes are to be displayed. Other graphic figure types can also be used as version indicators.

The version indicators 276, 278 may have a color associated with the user whose work was saved in that version. The color may refer to a color assigned to each user in a document sharing list. If a particular version was saved by a user no longer present on the document sharing list, the version indicator 276, 278 may have a gray color. If a version is selected by virtue of an action on the part of the user (e.g., the mouse controlling the cursor 152 is clicked), then the version selected may be used to replace the current version of the document 124 displayed in the GUI 108. Selected areas and scrolling are maintained, if possible.

The difference display, which is a display of changes between the two selected versions (indicated by the version indicators 278), can selectively be turned on or off. In addition, the versions to be used for a difference display can be selected, and when the difference display is active, there is the ability to jump from one change to the next throughout the document 124.

In the example GUI 108, the ability to select a first (e.g., more recent) version 158 and a second (e.g., older) version 260 is provided. Information describing the time, date, and author of the first version 158 is shown above the time line 104, while the information describing the time, date, and author of the second version 260 is shown below the time line 104. However, various embodiments are not to be so limited. Using a mouse-over (e.g., cursor hover) and click command, each version 158, 260 can be dynamically selected, one at a time.

A "Show Changes" checkbox 262 may be displayed in conjunction with the second version 260 (which may be displayed directly above the checkbox 262, so that the checkbox 262 is positioned beneath the default second version 260 even when unchecked), and a "Jump to next change" link 264 may also be displayed. The default second version 260 may be chosen by the system as the version that was last viewed by the current user, if desired.

To view changes in succession, the user can click on a "Jump to next change" link 264 to move to the next change that follows the current content selection/insertion point. The balloons 180 for that change are then displayed. The balloon 180 for each change may also be displayed upon mouse over operations for each change indicator 164.

Both the upper and lower tracks of the history bar 100 can be live for setting the first (e.g., current) version 158 and the second (e.g., prior) version 260. Using a mouse over operation, the version highlight and label can be made to change to show the version that will be selected for viewing if the mouse is clicked. The reader should note that the second version track does not exist directly beneath or to left of the first version track, since designers of many embodiments may decide that prior versions cannot be selected as a "more recent version" than the first version. When the "Show Changes" checkbox 262 is checked, differences between the two selected versions 158, 260 are indicated by change indicators 164. As in FIG. 1, multiple panes 270, 272, 280 are shown in FIG. 2 for purposes of economy. More typically, only a single pane per viewport 112 would be displayed to a user.

In pane 270, a multi-change collective format change indicator (e.g., similar to or identical to that shown as indicator 166 in pane 170 of FIG. 1) has split into multiple collective format change indicators 164 when a mouse-over and click operation is used to select it. In this case, the indicator 166 may split into three collective format change indicators 164, each summarizing a different type of change. For example, the revealed upper collective format change indicator 164 could be colored green and point toward the row to indicate that an item was added (not shown). The revealed lower collective format change indicator 164 could be colored red and point away from the row to indicate that an item was deleted (this is discussed with respect to pane 272 below). The revealed middle collective format change indicator 164, which is shown being selected by the hovering cursor 152 in this case, could be colored blue and not oriented in any particular way (e.g., a blue, circularly-shaped indicator 164) to indicate that item content has changed—and that the change was neither an addition nor a deletion. As noted in previous examples, if desired, the user may then "click" or otherwise act to select an individual item in one of the history balloons 182, 184, 186 to maintain the current item in its present state, or to return its value to a prior state by reusing prior content, or undoing a change, etc.

Here, the original multi-change collective format change indicator 166 (no longer shown) was associated with a header row, so the change histories detailed by the balloons 182, 184, 186 are those associated with changes to columns represented by titles in that row, or to the header content itself. For example, the balloon 182 indicates that the title for the "Activity" column has changed. The balloon 184 indicates that the formula for the "Location" column has changed. The balloon 186 indicates that the content value, type, and format in the "Time" column have all changed.

In pane 272, a cursor 152 hovers over the upper revealed collective format change indicator 164 located next to a highlighted header row. This indicator, which may be colored red and point away from the header row can serve to generally indicate that content has been deleted with respect to that row—in this case the "Location" column that is now revealed (e.g., with revised visibility, such as with reduced opacity) was deleted.

As noted in previous examples, if desired, the user may then "click" or otherwise act to select an individual item in the history balloon 180 to return the current value of the item to a prior state. If the value is returned to a prior state, this activity is also recorded as a change, and added to the content of the history balloon 180 for that item. Thus, the indicated activity (e.g., deletion) can be undone, and undoing the activity of deletion will itself be recorded as an additional change to form part of the content of the history balloon 180.

In pane 280, a cursor 152 hovers over a collective format change indicator 168 that indicates a change to the title assigned to the document 124. As noted in previous examples, if desired, the user may then "click" or otherwise act to select an individual item in the history balloon 180 to maintain the current item in its present state, or to return its value to a prior state. If the value is returned to a prior state, this activity is also recorded as a change, and added to the content of the history balloon 180 for that item. Thus, the indicated activity (e.g., change) can be undone, and undoing the activity will be recorded as an additional change to form part of the content of the history balloon 180.

In some embodiments, change is not indicated for every revision activity. For example, tracking the change history for an item may begin only after a particular database field associated with that item has assumed a value. Thus, the activity of creating a field in a series of records, such as a vertical column (e.g., representing the field) across several rows (e.g., representing the records), may be indicated as a change. However, each item of content for that column/field may not show a change upon assuming an initial value. Only after the initial, assumed value has itself been changed is a change indicated. Other embodiments may operate to indicate all change, including the occasion when a blank or otherwise empty field first assumes a value.

It should be noted that the various implementations described with respect to FIGS. 1 and 2 can be implemented by receiving information about the changes that have occurred between various versions of a database, and then displayed. Thus, the changes may be detected at one location (e.g., using a server), and then information regarding the changes, and/or various types of change, may be transmitted to another location (e.g., to a receiving entity, such as a client) to enable display of the changes, and various aspects of the changes. Thus many embodiments may be realized. Some of these include a variety of methods.

Figure 3:
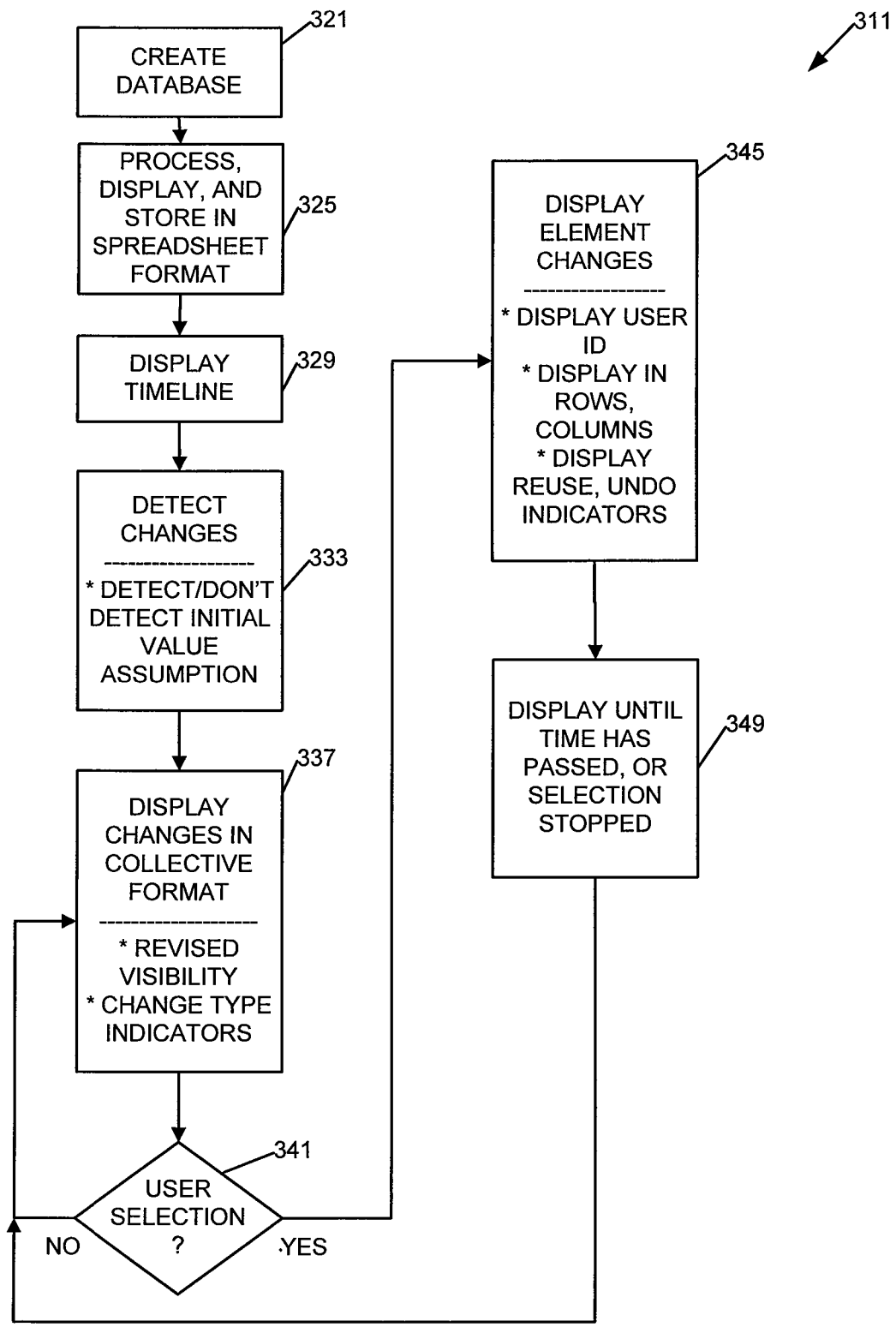
FIG. 3 is a flow diagram illustrating several methods according to various embodiments.

For example, FIG. 3 is a flow diagram illustrating several methods 311 according to various embodiments. In some embodiments, a computer implemented method 311 of detecting and transmitting changes to content stored in a database, perhaps to display changes between versions of a database, may begin at block 321 with creating a database, perhaps by storing electronic content as a collection of records that include one or more fields.

In some cases, the method 311 may include processing the database according to a spreadsheet format at block 325. For example, the database may be stored in a spreadsheet file format, and displayed as a spreadsheet to the user. A variety of formatting and formula operations may be applied to the database content, as occurs in spreadsheets known to those of ordinary skill in the art.

As noted previously, multiple versions of a database may be stored. A timeline history of the versions may be displayed. For example, the method 311 may include, at block 329, transmitting timeline information to a receiving entity (e.g., from a server to a client as the receiving entity, where the client may comprise a virtual client or a client comprising a computing device) to enable displaying a timeline that includes a first version and a second version of the database, as well as other versions. The terms "first" and "second" are used herein for convenience, do not designate absolute version numbers. Also, for convenience in explanation, the first version of the database may be assumed to be more recent than the second version of the database, although this is not the case for all embodiments. In any event, a timeline history bar with a plurality of database versions can be displayed.

Displaying the time line at block 329 may comprise displaying the time line as a substantially linear, horizontal arrangement of a plurality of version indicators, each one of the plurality of version indicators comprising a substantially similar shape that is spaced apart from others along the time line. Thus, the time line can be displayed as a history bar with a plurality of database versions using shapes as version indicators positioned along a horizontal line, with the versions spaced apart along the line. The shapes representing version indicators may include vertical bars; or square, circular, triangular, or elliptical icons. The version indicators may be substantially equally spaced apart along the time line. In some embodiments, the time line may be displayed vertically, instead of horizontally.

The method 311 may go on to include detecting a plurality of changes to the database format, the database content, or both, between the first version and the second version of the database at block 333. Depending on the specific implementation of the method 311, detecting the plurality of changes at block 333 includes detecting a transition in the database content from an element that is empty to an element that is non-empty. In some instances, this occurs the very first time an element assumes a value, and in others, only after the value initially assumed by an element is changed.

In the latter instance, the first time an element (e.g., a field in a record) assumes a value within the session/version where the element is created, the assumption of a specific value is not recorded as a change to the database. For example, if a new row is created and filled with data in the first session or version during which the database is created, neither the addition of the row, nor the assumption of data values is tracked as a change from a blank/empty value to a specific value. However, if the database already exists, and a new row is added, along with the assumption of values for the elements, just the added row is tracked as a change—the assumption of values is not tracked as a change. On the other hand, if a row is added, and only some of the fields are given values (e.g., other fields are left blank) prior to saving a second version, and then the remaining blank fields are filled in and saved as the first version, the change from empty fields to fields containing data values would be tracked as a change to the database.

The method 311 may go on to block 337 to include transmitting change information to a receiving entity (e.g., a client) to enable displaying the plurality of detected changes in at least one of a row-wise collective format or column-wise collective format, using visual indicia to indicate a coded summary of multiple non-identical changes in a single row or column, respectively. The changes may also be displayed in one or more of a field-wise collective format or a record-wise collective format. That is, multiple changes between versions are detected, and the non-identical changes are indicated in a collective format, perhaps arranged by rows and/or columns. The collective format display may also be organized by fields in a group of records and/or a group of records within a database.

An example of displaying the plurality of detected changes in a row-wise collective format or column-wise collective format comprises displaying visual indicia in the form of a change indicator along with a deleted row or a deleted column representing elements in the database with revised visibility. Deleted rows and columns can be shown with "revised visibility," defined as having an opacity of less than 95%, a contrast that is reduced from that of surrounding, non-deleted rows and columns, or as being contained within a different user interface, such as a floating, outlined user interface.

Another example of displaying the plurality of detected changes in a row-wise collective format or column-wise collective format comprises displaying visual indicia in the form of a change indicator comprising at least one of a color or a graphic shape to indicate a change type associated with the database content for a row or a column representing elements in the database. That is, a color, a shape, or both, can be used to indicate a summary of changes to the content of a row or a column. A graphic shape may comprise a geometric shape, an icon, or a combination of these.

The method 311 may continue on to block 341 with waiting to receive an indication of cursor hover activity (or some other form of detectable user selection input) associated with the change indicator. If no activity is detected, the method 311 may continue operating to enable display of the collective changes between versions at block 337.

If some indication of user selection input is received at block 341, the method 311 may include transmitting element change information to a receiving entity (e.g., a client) to enable displaying element changes for each element in the associated row or the column at block 345. Thus, as described with respect to FIGS. 1 and 2 above, hovering a cursor over a collective format change indicator as a form of detectable user selection input can operate to display all changes to the row or column associated with the indicator.

Displaying the element changes at block 345 may include displaying the identification of one or more users associated with the element changes, as well as displaying the time the element changes were made. For example, the display for each element change in a balloon can include the user name and time associated with the change.

The element changes to each element in a row or column representation of the database may be shown in separate windows. As discussed previously, hovering over summary change indicators can be used to show the history of individual changes, including the display of a selectable indicator that can be used to undo the changes shown. Thus, the method 311 may include, at block 345, transmitting indicator information to enable displaying an indicator within one or more of the separate windows to permit deleting added information, reinstating deleted information, and other actions. In some cases, the method 311 may include displaying the addition/deletion indicator only if cursor activity associated with the separate window is detected. For example, an undo indicator may be shown only if the cursor is moved near to, or hovers over, the window that displays the history for a particular change.

In some embodiments, the method 311 includes continually enabling the display of the element changes at block 349 for a selected period of time, or until cursor hover activity associated with another change indicator is detected. Thus, changes initiated by cursor hover activity may be displayed until a timer runs out, or until the cursor is moved to hover over another summary change indicator. The method 311 may then continue on to block 337, with displaying collective changes.

Figure 4:
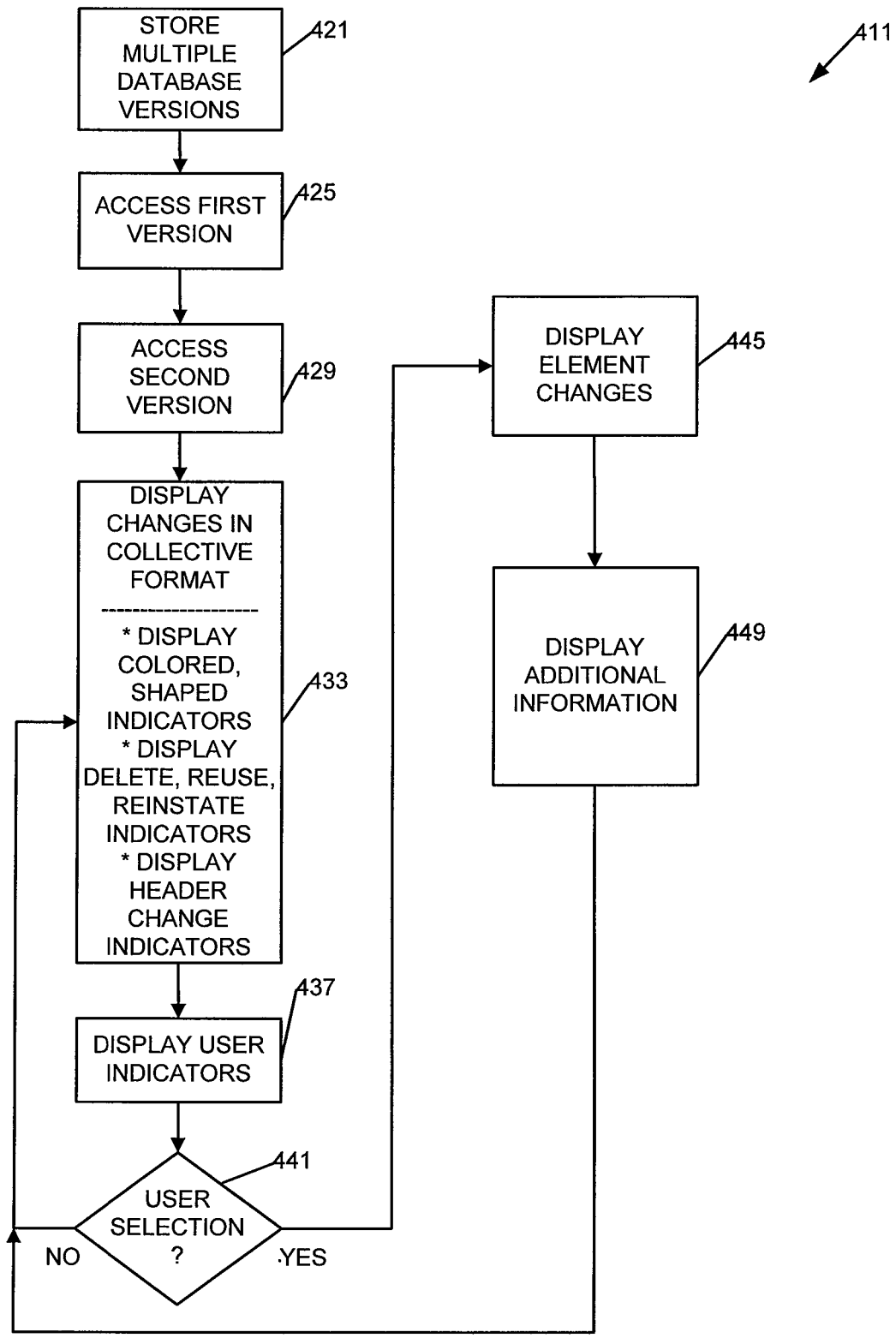
FIG. 4 is a flow diagram illustrating several additional methods according to various embodiments.

FIG. 4 is a flow diagram illustrating several additional methods 411 according to various embodiments. For example, a computer implemented method 411 of displaying changes to a database in a collective format may begin at block 421 with storing multiple versions of the database.

The method 411 may continue on to block 425 with accessing a first version of a database selected from a displayed time line, and then on to block 429 with accessing a second version of the database selected from the displayed time line. The method 411 may then include, at block 433, transmitting change information from a transmitting entity (e.g., a server) to a receiving entity (e.g., a client) to enable displaying a plurality of changes to the database format, the database content, or both, between the first version and the second version. The changes may be displayed in at least one of a row-wise collective format or column-wise collective format, wherein the collective format comprises visual indicia indicating a summary of non-identical change types to individual elements for each row and/or column representation of the individual elements in the database. For example, the visual indicia might include at least one of a shape or a color indicating a summary of change types to individual elements for each row and/or column representation of the individual elements in the database. Record-wise and field-wise collective format displays may also be used.

The changes can be displayed in a number of ways. For example, displaying the plurality of changes at block 433 may comprise displaying a first change indicator comprising a first color to indicate addition of an element to a first row or a column representing first elements in the database, and displaying a second change indicator comprising a second color to indicate deletion of an element from a second row or column representing second elements in the database. Additional colors and elements can be used. Thus, different colors, such as green, red, and blue can be used to indicate different content change types (e.g., addition, deletion, and some other type of change, respectively) for single rows and columns.

Displaying the plurality of changes at block 433 may also comprise displaying a shape in a first orientation to indicate addition of an element to a first row or a column representing first elements in the database, and displaying the shape in a second orientation to indicate deletion of an element from a second row or column representing second elements in the database. Thus, different shape orientations, such as pointing inward and outward, can be used to indicate different content change types (e.g., addition and deletion, respectively) for single rows and columns.

Displaying the plurality of changes at block 433 may also comprise displaying a change indicator comprising two or more of a first color to indicate addition of a first element to a row or a column representing elements in the database, a second color to indicate deletion of a second element from the row or column, or a third color to indicate changing a third element in the row or column. Additional colors and elements may be used. Such change indications may be summarized via a multi-change collective format change indicator, as discussed previously.

Displaying the plurality of changes at block 433 may also comprise displaying element changes in a header row representation of the database content in row-wise collective format. Thus, changes to columns forming a header row can be indicated in the same way as for other rows.

The method 411 may continue on to block 437 to include transmitting indicator information to a receiving entity (e.g., a client) to enable displaying a colored indicator for each one of a group of users on a time line, wherein the color of the colored indicator corresponds to an identity of a user in the group that saved a corresponding version of the database. Thus, the time line can be color-coded to associate users with versions of the database.

The method 411 may continue on to block 441 with waiting to receive an indication of user selection input, such as cursor hover activity, associated with a displayed change indicator. If no user selection input is detected, the method 411 may continue to display the collective changes between versions at block 433.

If some indication of user selection input is received at block 441, the method 411 may include transmitting element change information to enable displaying element changes for each element in a row or a column representation of the database at block 445, responsive to receiving an indication of cursor hover activity associated with the selected change indicator, which is associated in turn with a specific row or column. In this way, hovering a cursor over a change indicator may result in displaying all changes to its associated row or column. Displaying the element changes may occur in conjunction with displaying one of a value reuse indicator, an element deletion indicator, or an element reinstatement indicator, among others.

In some embodiments, the method 411 may include, at block 449, transmitting additional information to the receiving entity about the plurality of changes. For examples, the additional information received may enable displaying changes to one or more of a formula, content type, style, or format applied to a plurality of database elements associated with a columnar representation of the database, perhaps responsive to detecting cursor hover activity associated with a change indicator included in a column-wise collective format. Thus, formula change details can be indicated with respect to a column. So can changes to a content type, style, and format (e.g., content type: this column holds strings versus numbers; style: everything in this column is red; and format: dates in this column are in the format mm/dd/yyyy). The activity at block 449 may further include displaying additional information about the changes, including changes to the title applied to the database. The method 411 may then continue on to displaying the changes to the database using a collective format at block 433.

In either of the methods 311, 411, changes between user-selected versions of a database, or some default selection of versions (e.g., system-selected) may be displayed. For example, the methods 311, 411 may include establishing selection of one of the first version or the second version, or both, responsive to receiving either one of a user selection indication, or a system indication of selection (e.g., a default selection of versions, such as the current version, and the version prior to the current version that was last viewed by the user).

It should be noted that the methods described herein do not have to be executed in the order described, or in any particular order. Moreover, various activities described with respect to the methods identified herein can be executed in iterative, repetitive, serial, or parallel fashion. Activities within various methods may also be combined, to include combination across the various figures used herein. Information, including parameters, commands, operands, and other data, can be sent and received in the form of one or more carrier waves.

As explicitly stated in most cases, and implicitly understood in others, the various implementations described with respect to FIGS. 3 and 4 can be implemented by receiving information about the changes that have occurred between various versions of a database, and then displayed. Thus, the changes may be detected at one location (e.g., using a server), and then information regarding the changes, and/or various types of change, may be transmitted to another location (e.g., to a receiving entity, such as a client) to enable display of the changes, as well as various aspects of the changes. Thus, still further embodiments may be realized.

Figure 5:
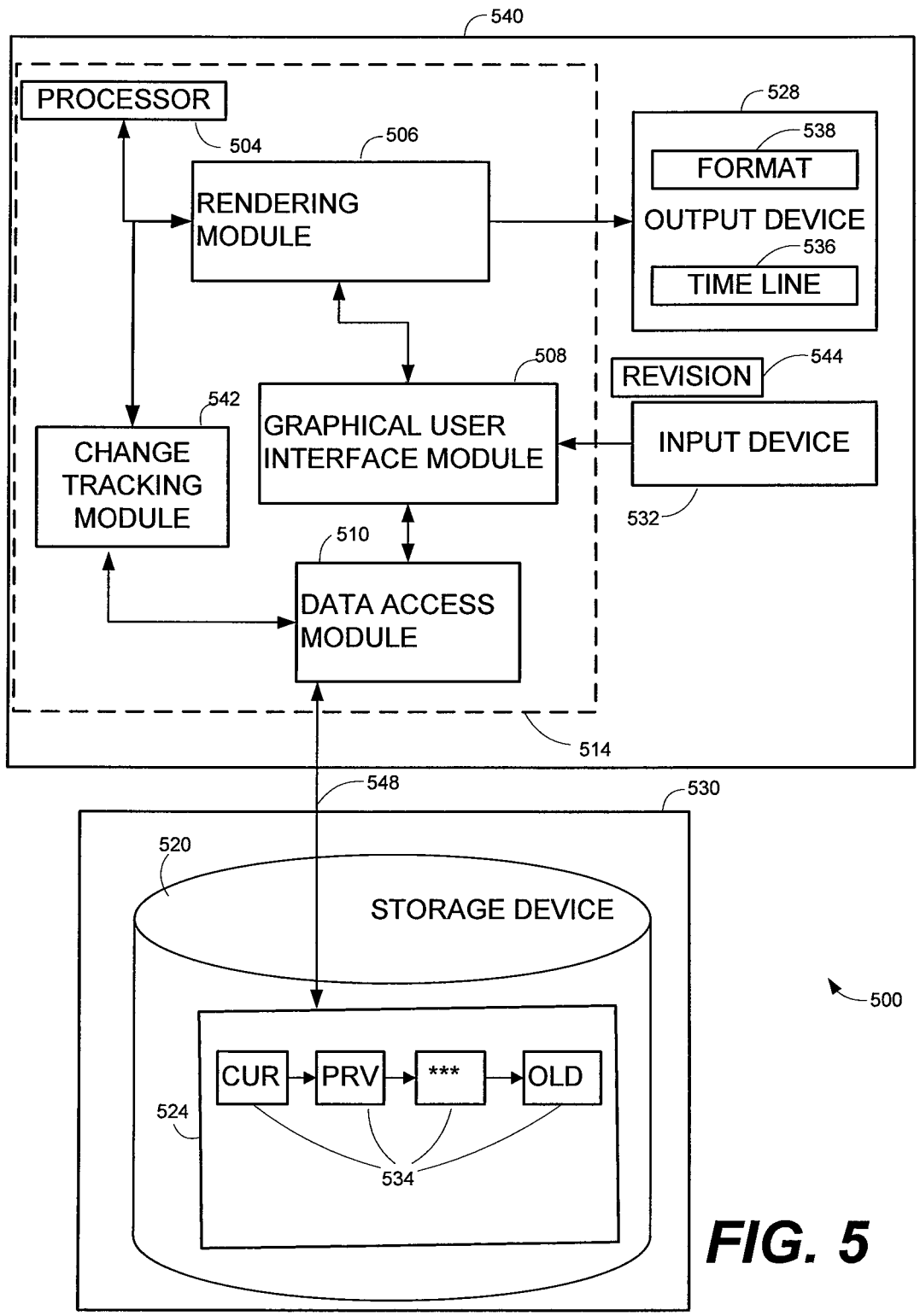
FIG. 5 is a block diagram of a system according to various embodiments.

For example, FIG. 5 is a block diagram of a system 500 according to various embodiments. The system 500 may include a number of modules, such as one or more processors 504, a rendering module 506, a GUI module 508 and a data access module 510. The rendering module 506 and the GUI module 508 may take the form of an integral module, or exist a separate modules, as shown. These modules may be associated within a machine 514, such as a personal digital assistant (PDA), laptop computer, personal computer, workstation, or server, as indicated by their containment within the dashed box.

In order to avoid obscuring the components of FIG. 5, connecting lines between each of the elements within the machine 514 have not been shown. However, those of ordinary skill in the art will understand that any of the individual elements shown to be located within the confines of the machine 514 may be operably coupled to any other element within the machine 514. Similarly, those of ordinary skill in the art will understand that any of the components shown to be located within the confines of the machine 514 may also be located outside the machine 514, and appropriately coupled to the machine 514 via wired or wireless networks or other interface mechanisms.

The data access module 510 may be used by the rendering module 506 to access a storage device 520, such as a database, a memory, a disk, or other storage device. The storage device 520 may serve to contain one or more items of electronic content 524. The data access module 510 may operate to read from and/or write to the electronic content 524 and may provide reading and writing services for the benefit of other system modules, including the GUI 508, the processor 504, and the rendering module 506. The electronic content 524 may include one or more content elements 534, such as various versions of a document or a database, including the current version CUR, a previous version PRV, and the oldest version OLD.

The data access module 510 may be present in some embodiments, and absent in others. When present, the data access module 510 may operate as a mediator between the various components of the system 500 and the electronic content 524. For example, the storage device 520 may be included in a remote server 530.

The rendering module 506 may be operably coupled to an output device 528, such as a display screen, printer, or loudspeaker, among others. This output device 528 may be used for presenting renderings of content elements 534. Rendering may take the form of displaying the content elements 534, a time line 536, indications of content elements 534 that have been selected for display, and changes between the elements 534 in a collective format 538, as shown in FIGS. 1-2.

A GUI module 508 may be operably connected to the rendering module 506 and the data access module 510. The rendering module 506 may comprise a portable document format processing program, or a database processing program, among others.

The GUI module 508 may receive input from input devices 532 (e.g., a keyboard, a mouse, a trackball, voice recognizer, touch pad, touch screen, etc.), including user input comprising a "Save" command to save a revision 544 of the electronic content 524 in response to the GUI presented by an electronic content reviewing application. Thus, many embodiments may be realized.

For example, a system 500 to display electronic content version history, and changes between the versions, may comprise an output device 528 in the form of a display, and a storage device 520 to store a plurality of versions of electronic content 524, including a first version newer than a second version (e.g., the current version CUR may be chosen as the first version, and the previous version PRV may be chosen as the second version).

The system 500 may include a rendering module 506 to display, as part of a GUI on the display, a time line 536 comprising a plurality of version indicators corresponding to the plurality of versions. Selection indicators and information regarding changes between the first version and the second version may be received and displayed at the same time as the time line, as described previously. The system 500 may comprise a workstation, or some other set of components, that operates to display the changes between the content elements 534 (e.g., versions of the electronic content 524).

In some embodiments, the system 500 may comprise a server device 530 including the storage device 520, and a client device 540 to couple to the server device 530 via a network 548, the client device 540 including the display (e.g., as part of the output device 528).

In some embodiments, the rendering module 506 comprises a word processing document application program. The system 500 may comprise a processor 504 to execute the word processing application program to display the electronic content 524 as one or more paginated documents, along with the time line 536 (e.g., perhaps a substantially horizontal time line), via the GUI module 508.

In some embodiments, the rendering module 506 comprises a spreadsheet application program. The system 500 may comprise a processor 504 to execute the spreadsheet application program to display the database content as a spreadsheet along with a history of multiple, independently-selectable versions of the database on a time line, including the first version and the second version, via the GUI, as described with respect to FIG. 2.

In some embodiments, a system 500 comprises an output device 528, such as a display, a change tracking module 542, and a rendering module 506. The change tracking module 542 can be used to detect a plurality of changes to database format, database content, or both, between a first version of a database and a second version of the database. The rendering module 506 can be used to display the plurality of changes in at least one of a row-wise collective or column-wise collective format as part of a GUI on the display.

The system 500 may comprise a user input device 532 to select a change indicator comprising a color, a shape, or both. Selection of the change indicator may result in the rendering module 506 operating to display all changes to the database content for one or more rows and/or columns.

Figure 6:
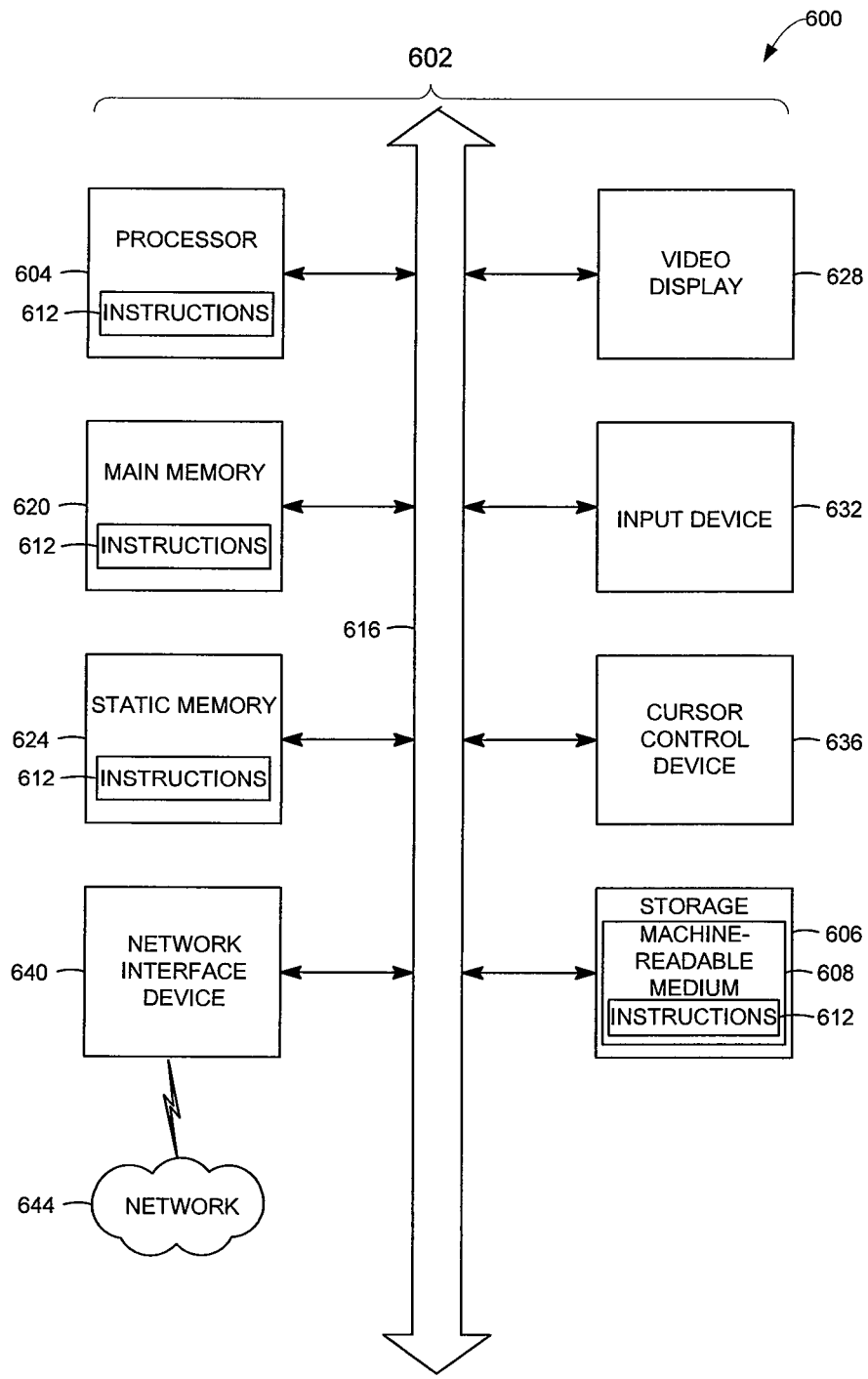
FIG. 6 is a block diagram of an article of manufacture, including a machine, according to various embodiments.

FIG. 6 is a block diagram of an article 600 of manufacture, including a machine 602, according to various embodiments. Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or inter-process communication techniques, including remote procedure calls. The teachings of various embodiments are not limited to any particular programming language or environment.

Thus, other embodiments may be realized. For example, an article 600 of manufacture, such as a computer, a memory system, a magnetic or optical disk, some other storage device, and/or any type of electronic device or system may include one or more processors 604 coupled to a machine-readable medium 608 such as a memory (e.g., removable storage media, as well as any memory including an electrical, optical, or electromagnetic conductor) having instructions 612 stored thereon (e.g., computer program instructions), which when executed by the one or more processors 604 result in the machine 602 performing any of the actions described with respect to the methods above.

Machine 602 may take the form of a computer system having a processor 604 coupled to a number of components directly, and/or using a bus 616. Thus, the machine 602 may be similar to or identical to the system 500 shown in FIG. 5.

Turning now to FIG. 6, it can be seen that the components of the machine 602 may include main memory 620, static or non-volatile memory 624, and mass storage 606. Other components coupled to the processor 604 may include an output device 628, such as a video display, an input device 632, such as a keyboard, and a cursor control device 636, such as a mouse. A network interface device 640 to couple the processor 604 and other components to a network 644 may also be coupled to the bus 616. The instructions 612 may further be transmitted or received over the network 644 via the network interface device 640 utilizing any one of a number of well-known transfer protocols (e.g., the Hyper-Text Transfer Protocol). Any of these elements coupled to the bus 616 may be absent, present singly, or present in plural numbers, depending on the specific embodiment to be realized.

The processor 604, the memories 620, 624, and the storage device 606 may each include instructions 612 which, when executed, cause the machine 602 to perform any one or more of the methods described herein. In alternative embodiments, the machine 602 operates as a standalone device or may be connected (e.g., networked) to other machines. In a networked environment, the machine 602 may operate in the capacity of a server or a client machine in server-client network environment, or as a peer machine in a peer-to-peer (or distributed) network environment. The machine 602 may comprise a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine 602 is illustrated, the term "machine" shall also be taken to include any collection of machines that individually or jointly execute a set (or multiple sets) of instructions to perform any one or more of the methodologies discussed herein.

While the machine-readable medium 608 is shown as a single medium, the term "machine-readable medium" should be taken to include a single medium or multiple media (e.g., a centralized or distributed database, and/or associated caches and servers, and or a variety of storage media, such as the processor 604 registers, memories 620, 624, and the storage device 606) that store the one or more sets of instructions 612. The term "machine-readable medium" shall also be taken to include any medium that is capable of storing, encoding or carrying a set of instructions for execution by the machine and that cause the machine 602 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Implementing the apparatus, systems, and methods of the various embodiments may provide the ability to more easily and quickly select for viewing the changes that have occurred between specific versions of electronic content stored in a database. For example, when a database in the form of a spreadsheet is displayed, providing the changes in row-wise collective format permit the reviewer to see a summary of all of the changes that have occurred in a row—even for cells that are not themselves displayed on an output device. Thus, a more complete picture of the changes within a database can be presented, such that user comprehension an satisfaction may increase, along with a decrease in errors made while updating the database content.

Although embodiments of the invention have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those of ordinary skill in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Embodiments may, for example, be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A computer implemented method comprising:
   detecting a plurality of changes to database content between a first version of a database and a second version of the database;
   transmitting change information associated with the plurality of changes to a receiving entity;
   causing a display of a single visual element that is associated with the plurality of changes based on the change information, wherein the single visual element indicates a coded summary of changes to multiple non-identical content elements in a single row or a single column within the database and the single visual element is displayed adjacent to the single row or the single column;

receiving input indicative of a user selection of the single visual element; and responsive to receiving the input, causing a separate display corresponding with each of the content elements changed in the single row or the single column, the separate display for each content element providing an indication of one or more changes to the corresponding content element.

2. The method of claim 1, wherein the detecting of the plurality of changes does not include detecting a transition in the database content from an element that is empty to an element that is non-empty.

3. The method of claim 1, further comprising:
storing the database in a spreadsheet file format.

4. The method of claim 1, further comprising:
transmitting timeline information to the receiving entity to cause a display of a timeline that includes the first version and the second version.

5. The method of claim 1, wherein the display of the single visual element that is associated with the plurality of changes comprises:
a display of a first change indicator comprising at least one of a color or a graphic shape to indicate a change type associated with the database content for the single row or the single column.

6. The method of claim 1, wherein the separate display corresponding with each of the content elements changed in the single row of the single column further comprises:
continuing to display the separate display for a determinable period of time, or until user selection input associated with a second change indicator is detected.

7. The method of claim 1, wherein the separate display corresponding with each of the content elements changed in the single row of the single column further comprises:
an identification of a user and a time associated with the one or more changes to the corresponding content element.

8. A computer implemented method comprising:
accessing a first version of a database selected from a displayed time line;
accessing a second version of the database selected from the displayed time line;
detecting a plurality of changes to database content between the first version of the database and the second version of the database;
transmitting change information associated with the plurality of changes to a receiving entity; and
causing a display of a single visual element that is associated with the plurality of changes based on the change information, wherein the single visual element indicates a coded summary of changes to multiple non-identical content elements in a single row or a single column in the database and the single visual element is displayed adjacent to the single row or the single column;
receiving input indicative of a user selection of the single visual element; and
responsive to receiving the input, causing a separate display corresponding with each of the content elements changed in the single row or the single column, the separate display for each content element providing an indication of one or more changes to the corresponding content element.

9. The method of claim 8, further comprising:
transmitting indicator information to the receiving entity to cause a display of a colored indicator for each one of a group of users on the time line, wherein a color of the colored indicator corresponds to an identity of a user in the group that saved a corresponding version of the database.

10. The method of claim 8, wherein the display of the single visual element that is associated with the plurality of changes comprises:
a display of a first change indicator to indicate addition of a first content element to the row or column; or
a display of a second change indicator to indicate deletion of a second content element from the row or column.

11. The method of claim 8, wherein the display of the single visual element that is associated with the plurality of changes comprises:
a display of a shape in a first orientation to indicate addition of a first content element to the row or column; or
a display of the shape in a second orientation to indicate deletion of a second content element from the row or column.

12. The method of claim 8, wherein the display of the single visual element that is associated with the plurality of changes comprises:
a display of a change indicator comprising at least two of:
a first color to indicate addition of a first content element to the row or column, a second color to indicate deletion of a second content element from the row or column, or a third color to indicate changing a third content element in the row or column.

13. The method of claim 8, wherein the display of the single visual element that is associated with the plurality of changes
corresponds to a header row representation of the database.

14. A system, comprising:
a display;
a change tracking module to detect a plurality of changes to database content between a first version of a database and a second version of the database;
a rendering module to cause the display of a single visual element that is associated with the plurality of changes based on the change information, wherein the single visual element indicates a coded summary of changes to multiple non-identical content elements in a single row or a single column of the database and the single visual element is displayed adjacent to the single row or the single column, as part of a graphical user interface on the display; and
a graphical user interface module to receive input indicative of a user selection of the single visual element and, responsive to receiving the input, cause a separate display corresponding with each of the content elements changed in the single row or the single column, the separate display for each content element providing an indication of one or more changes to the corresponding content element.

15. The system of claim 14, wherein the rendering module comprises a spreadsheet application program, the system further comprising:
a processor to execute the spreadsheet application program to display the database content as a spreadsheet along with a history of multiple, independently selectable versions of the database on a time line, including the first version and the second version, via the graphical user interface.

16. A non-transitory machine-readable medium having instructions stored therein, wherein the instructions, when executed, cause the machine to perform operations, comprising:

detecting a plurality of changes to database content between a first version of a database and a second version of the database;

transmitting change information associated with the plurality of changes to a receiving entity;

causing a display of a single visual element that is associated with the plurality of changes based on the change information, wherein the single visual element indicates a coded summary of changes to multiple non-identical content elements in a single row or a single column within the database, and the single visual element is displayed adjacent to the single row or the single column;

receiving input indicative of a user selection of the single visual element; and responsive to receiving the input, causing a separate display corresponding with each of the content elements changed in the single row or the single column, the separate display for each content element providing an indication of one or more changes to the corresponding content element.

* * * * *